United States Patent [19]
Moisdon

[11] 4,286,434
[45] Sep. 1, 1981

[54] SOLAR POWER PLANT EQUIPPED WITH HIGH EFFICIENCY HEAT EXCHANGERS

[76] Inventor: Roger F. Moisdon, 4875 SW. 28th Ave., Fort Lauderdale, Fla. 33312

[21] Appl. No.: 969,451

[22] Filed: Dec. 19, 1978

[51] Int. Cl.³ ............................................. F03G 7/04
[52] U.S. Cl. .................................. 60/641 B; 60/657; 165/95
[58] Field of Search ............. 60/641, 657, 646, 641 A, 60/641 B; 165/45, 95

[56] References Cited
U.S. PATENT DOCUMENTS

| | | | |
|---|---|---|---|
| 3,805,515 | 4/1974 | Zener | 60/641 |
| 4,014,279 | 3/1977 | Pearson | 60/641 X |
| 4,041,707 | 8/1977 | Spector | 60/641 |
| 4,116,009 | 9/1978 | Daubin | 60/641 X |

Primary Examiner—Allen M. Ostrager
Assistant Examiner—Stephen F. Husar

[57] ABSTRACT

This is a description of solar power plant having a plurality of modular units, which form improved heat exchangers by enhancement of heat transfer surfaces, through the action of wipers and the draining down of transfer surfaces. The whole structure is insulated by a film of lubricant, and a solar heater booster provides additional heating capabilities.

1 Claim, 13 Drawing Figures

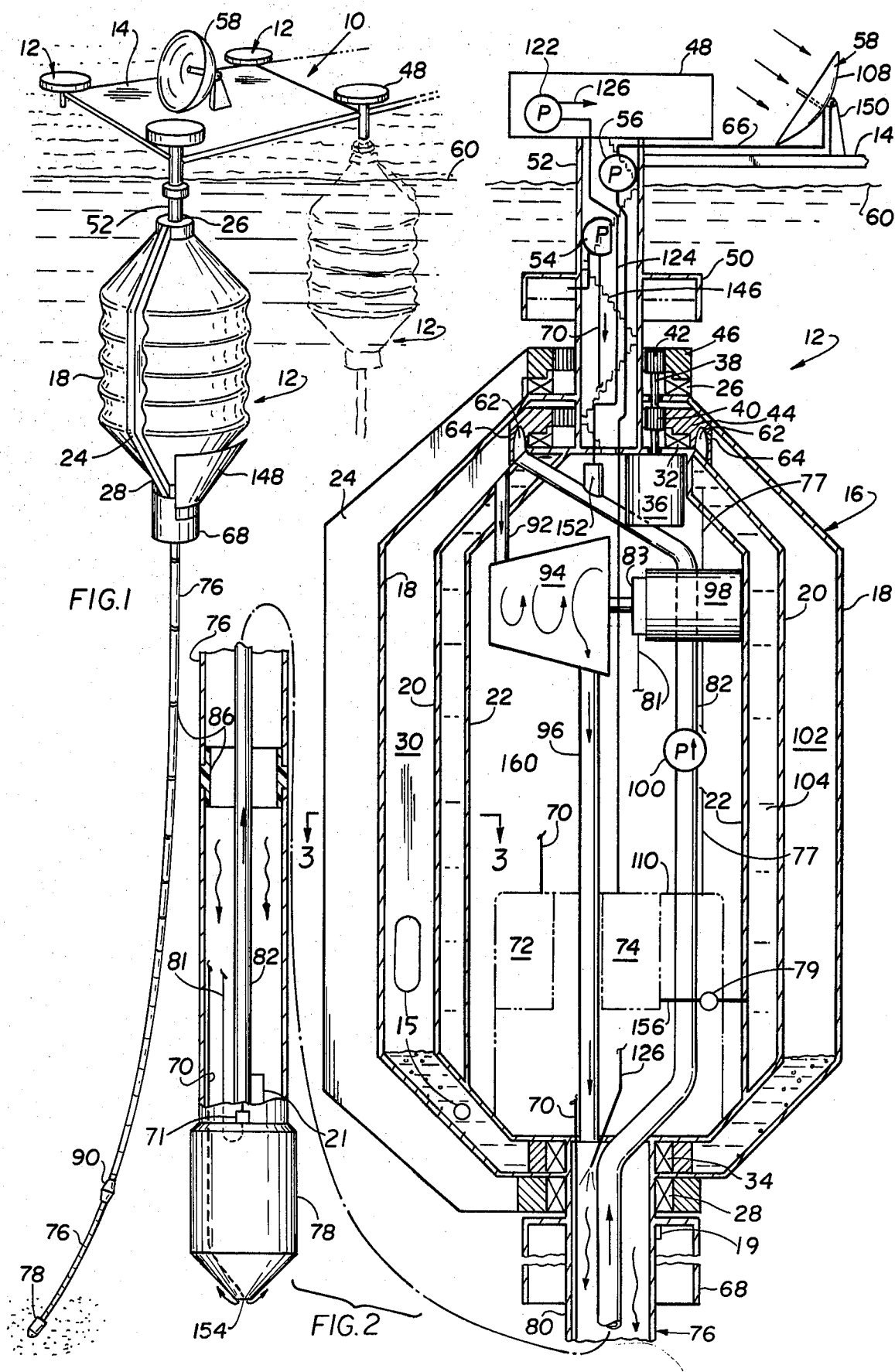

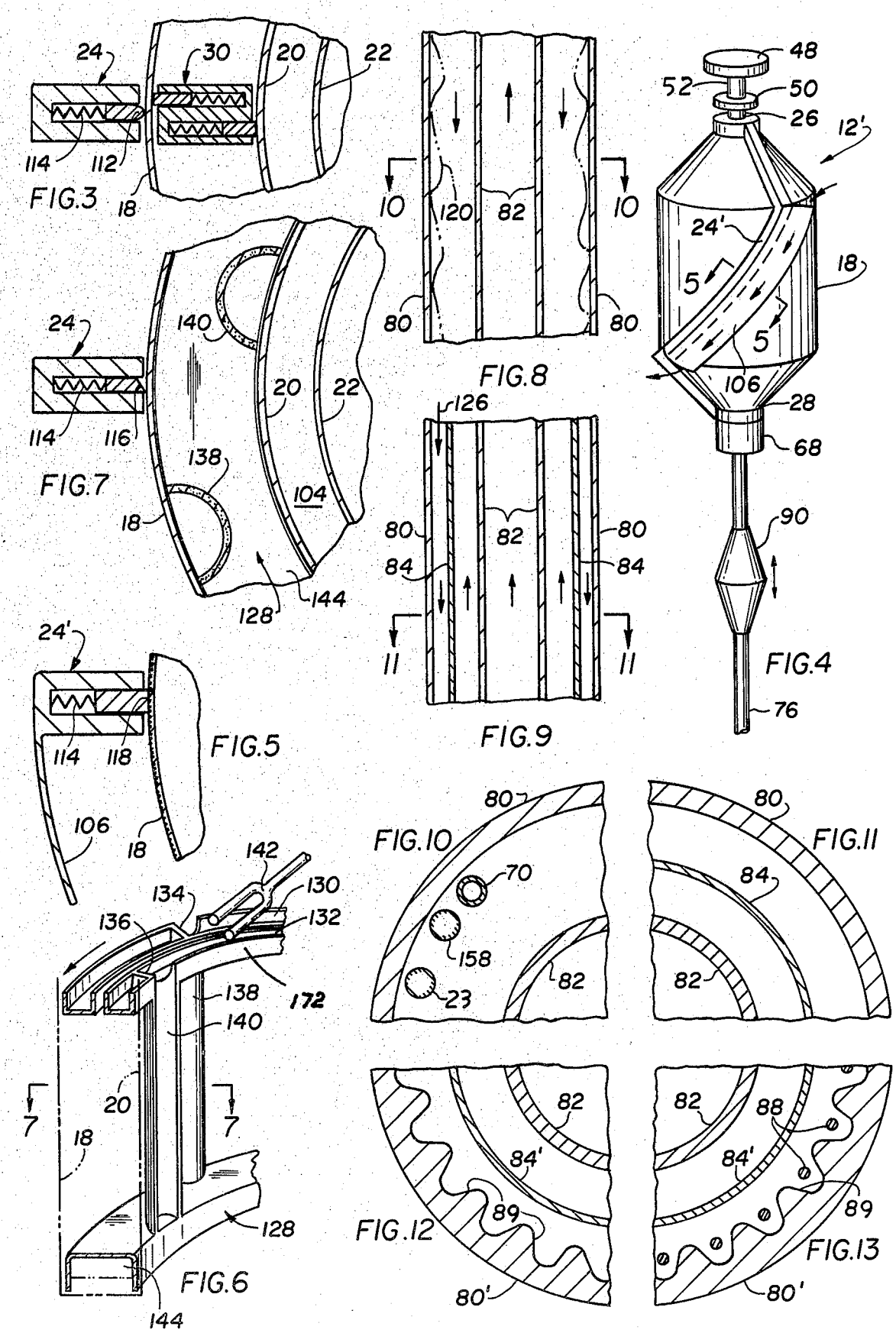

SOLAR POWER PLANT EQUIPPED WITH HIGH EFFICIENCY HEAT EXCHANGERS

This invention relates generally to a solar thermal energy conversion apparatus, and is directed particularly to a novel solar power plant. This plant is comprised of a plurality of semi-submerged floatable structures, above which, supported entirely above the surface of water is a superstructure platform constituting a solar collector booster, crew quarter, pilot house, and helicopter landing area.

At the present time, because of several unsolved problems and an inadequate technical approach to related problems, solar sea power plant technique is mostly a nerveless attempt to harness the limitless power of oceans.

The working conditions in a sea environment are so particular and difficult that very few land techniques can be used without very important problems.

So far, proposed projects use conventional types of land-based heat exchangers, huge pumps, pipes, electric cables, tubes and shells evaporators or condensers, and bulky housing structures. These are not only unnecessary but very expensive to repair and maintain. The corrosion and biofouling reduce constantly, progressively, rapidly, the efficiency of the walls of the heat exchangers, damaging them and leading to leaks which are very expensive to repair.

The accumulation of scales imposes very toilsome cleaning operations and causes shut downs for long periods of time. This is also associated with environmental pollution by the cleaning substance applied.

The tubes and shells, plates, panels, and coils types of heat exchangers all have the same defects in heat transfer, occuring through drops and films forming, unwetted areas, ripples and fluted dry areas, as well as fluid-poor repartition, pressure drops, etc . . .

The electric cable bridging the solar sea power plant to shore imposes a stationary geographical position at sea, therefore not permitting the transfer efficiency to be obtained when said solar sea power plant can follow the fluctuations of the greatest differences of temperature between the surface and the bottom of the sea.

Said electric cable can also be very hazardous at sea where the water is highly conductive of electricity.

In addition to the prohibitive cost of construction, said electric cable allows only one geographical coastal area of delivery of power which can be needed elsewhere, and suffers important losses in transmitted power energy along with an impossible storage situation. Equally, if the cold water from the depths is to be risen to the surface, not only said temperature is likely to drop, but an environmental impact is to be expected and such drop in surface temperature is likely to diminish the possible output power tremendously.

Therefore, such a concept is not worthy of consideration at all at sea.

It is, accordingly, the principal object of the present invention to obviate the above described deficiencies of solar power plants and provide a new type of self-contained power plant into which no water is admitted beyond the housing walls, the whole structure being insulated from the surrounding waters. The related heat exchangers have no tubes, or plates or shells. Said solar power plant being conceived according to new techniques, with heat exchangers having their heat transfer surfaces constantly brushed and cleaned by highly heat conducting wipers which keep said surfaces clean, increasing their heat transfer capabilities several times and providing a much more efficient, economical, always clean and practical heat exchanger.

In this connection, it will be understood that said type of solar power plant will have the advantage of not being affected by corrosion or biofouling and other adverse conditions common to conventional solar power plants.

Instead of an electric cable, bridging the solar power plant to the shore, floatable tanks, filled up by highly compressed gas and towed for example by a tug, provide the advantages of safe operation, lesser energy losses in power transmission, economical construction, and with delivery and storage everywhere at any time for as long as needed. Therefore, appropriate temperature sensors and micro processors are responsible for automatic adjustment of position of said solar power plant which consequently is free to sail anywhere in order to get the best temperature difference of waters. Or, if the said solar power plant is to be anchored not too far from shore, the delivery can be made through a pipeline for the yielded fluid transfer.

A more particular object is to provide a solar power plant of the character described, which, because of its constantly brushed exchanger walls and constantly mixed fluids along with its wipers distributing heat, is capable of much greater heat exchange transfer. The well known related problems such as surface film forming, drop forming, condensate waves, unwetted or dryed areas, unevenly fluid repartition, pressure drops, speed of drain of condensate, corrosion and biofouling on the water side, etc . . . are then avoided.

Yet another object is to provide a solar power plant of the character described wherein a special type of annular-shaped ring tank wiper is used to keep such structures as heat exchanger walls, spar, braces, condensing pipes, pedestal, etc . . . always clean and efficient.

Still another object is to provide a solar power plant of the character described including a special type of wiper used in the working fluid evaporator chamber and having a turbine driver actuated by the flow of said fluid pumped into said chamber.

Said wipers have a gutter type impeller feeding a plurality of porous containers in contact with the heat exchanger surfaces, said wipers being supported by a buoyant tank at its lower portion.

Yet another object is to provide a solar power plant of the character described, including a working fluid condensing pipe being used in replacement of a wiped condenser of the same type as the above described evaporator which is not illustrated.

Still another object is to provide a solar power plant of the character described having the heat transfer coefficient of the above mentioned condensing pipe enhanced by blowing a portion of working fluid gas into the annular space situated close to its outside wall. Said working fluid gas is injected at the bottom of the working fluid pipe return to have a lifting action.

Yet another object is to provide a solar power plant of the character described comprising a solar booster heater set at the top of the platform, using concentrated and reflected sun rays, or other schemes, in order to heat the working fluid.

It is a further object to provide a solar power plant of the character described comprising a working fluid chamber sprayed by an internal wiper, of helicoidal form, rotating in said chamber in order to rise the dropped liquid.

Yet it is a further object to provide a solar power plant of the character described, being entirely lubricated by a pump forcing the lubricant out of the lowest point of its structure, then spread by wipers over said structure which can be striated, porous, lubricated before immersion.

Still another object is to provide a solar power plant of the character described having corrugated walls of heat transfer multiplied in order to increase the active surface of said heat exchanger.

It is a further object to provide a solar power plant condenser having a network of wires specifically disposed in a position appropriate for breaking the surface tension of the ripples or waves of condensate accumulated in the fluted condensing walls, thus providing a rapid drainage of the condensate.

Still another object is to provide a solar power plant of the character described having a flange attached to the outer rim of the water wiper in order to drive the cooled water down to the new layer of water where it belongs because of its loss of temperature and consequently its new state of gravity, said wiper having means for recovering the excess of lubricant.

Yet another object is to provide a solar power plant having appropriate ballast tanks set inside along each modular structure in order to provide a differential buoyancy placing the all-modular structure in working position or in a surface position for easier maintenance and services. The pedestal being articulated for such handling on the superstructure.

Still another object is to provide a solar power plant having a service collar for maintenance of the condensing pipe wiper and recovery of lubricant.

Other objects, features, and advantages of the invention will be apparent from the following description when read with references to the accompanying drawings.

In the drawings, wherein like reference numerals denote corresponding parts throughout the several views:

FIG. 1 shows an overall view of a preferred embodiment of the device.

FIG. 2 is a cross section of one of the units of the device

FIG. 3 is a cross section per line 3—3 FIG. 2.

FIG. 4 is an overall view of a single unit showing an alternate embodiment.

FIG. 5 is a sectional view per line 5—5 FIG. 4.

FIG. 6 is a partial perspective view of an alternate "film wiper".

FIG. 7 is a sectional view of the device in FIG. 6 showing wipe action against boiler walls per line 7—7 FIG. 6.

FIG. 8 shows a cross section of pipe condenser with "condensate wave" formation.

FIG. 9 shows a cross section of pipe condenser with additional coaxial tube to add "blow action".

FIG. 10 is a section per line 10—10 FIG. 8.

FIG. 11 is a section per line 11—11 FIG. 9.

FIG. 12 is a further approach to alleviate "wave action".

FIG. 13 is a yet further approach to alleviate "wave action" by adding a surface tension breaker wire to "corrugated" wall.

Referring now in detail to the drawings, reference numeral 10 in FIG. 1 designates a solar power plant embodying the invention. The same being illustrated by way of example, non-limiting, in the form of a large solar power plant made of a plurality of modular units, capable of a large amount of power production. It will be understood, however, that the principals of the invention can be applied as well to smaller solar power plants as well as for any other applications possible wherever the needed temperature difference is available.

Although said power plant is illustrated with a condensing pipe as condenser, it is contemplated that the condensing operation can be made by a condenser of the same type as the described evaporator.

Although each unit can be used separately, a preferred embodiment of the said solar power plant 10 comprises generally, several modular units linked together by the superstructure 14 which supports solar collector 58 and the towers 48 containing: crew quarters, controls, and equipments. A pedestal 52 connecting said superstructure 14 to modular unit 12 comprising an outer wall 18, corrugated or not, a wiper 24 rotating on bearings 26 and 28, a propulsive fin 148 attached to the service collar 68, a flexible condensing pipe 76 with flexible joints 86, an annular wiper tank 90 and a recirculating pump 78.

The solar power plant 10 is of such buoyancy and so controlled through the ballast tanks 110 of FIG. 2 that the surface of the water will lie at about half the distance from the top of the pedestal 52, as indicated by the line 60. In this position it will be seen that the superstructure 14, which contains the crew quarters, pilot house, solar booster and landing platforms for helicopter is maintained well above the water surface.

The evaporator modular structure 12 will preferably be made of corrugated walls 18, providing more surface in the same space. But because such modular units 12 can be stacked one over the other, such corrugated walls may not be necessary.

The propulsive fin 148 is a concentric channel into which the wiper 24 pushes the water one way, the steering being made by turning the whole modular unit at the articulated portion of the superstructure 14 attached to the pedestal 52 (steering, articulation and lock not shown).

The condensing pipe 76 is preferably made of sections of good heat conducting material for the outer wall of said pipe 76 joined by flexible joints 86 and of poor heat-conducting material for the inner liquid pipe 82, such as plastic material. The condenser pipe wiper 90 is of a ballasted tank preferably ovoid-shaped and the recirculating pump 78 is attached to the end of said pipe 76 which can be ballasted to the water surface by pumping out the working liquid from said condensing pipe 76.

As illustrated in FIG. 2 the top portion of the pedestal 52 is attached to a tower 48 containing a blower 122, which is connected to the separator 152 through the conduit 124, blowing the working fluid, in gas state, through the conduit 126 into the condensing pipe 76.

The connecting structure 14 of modular units 12 supports a brace 150 holding a parabolic mirror 108 of a solar collector booster 58 having a double solar fluid line 66 fitted to a pump 56 connected to an insulated solar fluid tank storage 74 fitted through pipe 156 to the temperate solar fluid chamber 104 through a pump 79. A stairway 146 is connecting the tower 48 to the engine room 160.

An oil containment collar 50 fitted to the pedestal 52 is connected to a pump 54. The oil line conduit 70 is fitted to the oil storage tank 72 and to the oil release apperature 154.

The outer wiper 24, which can be used into any kind of boiler, is secured to structure pedestal 52 by upper bearing 26 and to the outer casing 80 by lower bearing 28. The inner wiper 30 is secured to the structure pedestal 52 by upper bearing 32 and to the outer casing 80 by the lower bearing 34.

Two gear rings 44 and 46, connected to the wipers 30 and 24, respectively, are rotating them by two gear pinions 40 and 42 secured to the shaft 38 of the motor 36. The gear ring 44 has a circular channel 62 fitted to the top portion of the intermediate wall 20 which is fitted to the top end of the pipe 82 at the right position in order to have said channel 62 connected permanently to the liquid line of working fluid 82. Said channel 62 being under pressure from the action of the pump 100 has spray heads 64 spraying the working liquid into the boiler chamber 102.

The turbine 94 receives the working fluid in a gas state, under pressure through conduit 92 and discharges the working fluid through conduit 96 into the condensing pipe 76 and rotates the gas compressor or electric generator 98 along with air compressor 83.

Since such parts as demisters and pumps, condensate pumps, reflux pumps, etc . . . are well known, they are not shown.

A recirculating pump 100 is fitted to the liquid line of working fluid 82.

A boiler chamber 102 is contained between the walls 18 and 20.

A solar fluid tank is contained between between walls 20 and 22.

A service collar 68 is fitted to the outer casing 80 at the top portion of condensing pipe.

Flexible joints 86 are provided between sections of pipes 76 in order to obtain the necessary working flexibility. The pump 78 is fitted to the lower end of the pipe 76 feeded by the condensate and discharged into the liquid line 82.

As illustrated in FIGS. 6 and 7, some inner porous riser wipers 138 and 140 are rotating between walls 18 and 20, wetting them with the working liquid collected from the gutters 130 and 132 and forming an impeller for the wiper 172. The liquid jet of working fluid is injected through a dual nozzle 142 and pushes on the blades 134 and 136. The lower portion of described wiper 172 being in the form of a floatable annular tank 128 which supports said wiper 172 and is used as a bearing. Said porous riser wipers 138, 140, etc . . . are diffusing the gas that escapes from their porous surfaces into the boiler chamber 102. It is contemplated that tank 128 can be hermetically closed.

As illustrated in FIG. 4 the overall form of the described evaporator outer walls 18 can be used to construct the gascompressed power energy transfer tanks.

Fitted on the pedestal 52, are the tower 48 and oil containment collar 50. On the outer wall 18 of modular unit 12 is a wiper 24' fitted by a flange extension 106 pushing downward the water as shown by arrows. Said flanged wiper rotatively mounted on bearings 26 and 28 can be used on a condenser of the type above described in order to rise the cold water.

A wiper ballast tank 90 is loosely fitted on the pipe 76, the service collar 68 is fitted to the bottom portion of unit 12.

As illustrated in FIG. 8, the ripples of condensate are pushed downward.

As illustrated in FIG. 10, between the two walls 80 and 82 are set a line of power and control 158, to pump 78, an oil line 70 and a line of power and control 23 to pump 21 (FIG. 2).

As illustrated in FIGS. 9 and 11, an inner wall 84 is dividing the space between walls 80 and 82, and is used to blow the gas of working fluid downward as shown by arrow 126 between walls 84 and 80, with return flow of the same gas between 82 and 84.

As illustrated on FIG. 12, the flutes 89 of outer wall 80' are used instead of smooth wall 80 of FIG. 11, but Their condensate is blown downward by the same process as above described for FIG. 11.

As illustrated in FIG. 13, the flutes 89 of the outer wall 80' are equipped by a network of wires 88 and the collected condensate is blown downward.

As illustrated in FIG. 2, it will be understood that the solar power plant herein described is powered by the temperature difference between the surface of the water and its depths. The warm temperature of the surface being transferred to the working fluid in evaporator unit 12 and boiler chamber 102 through the wall 18 always kept clean by the action of the wiper 24, which collects said warm temperature through the warm water and brings it to the outer wall 18 by heat conduction. Such warm temperature is then recovered again by conduction through the action of the inner wiper 30 of boiler 102 and distributed through said boiler chamber 102. Said wiper 30 may have holes in it, like holes 15, in order to have better working fluid gas and/or liquid mixing.

At the same time, the heat collected by the solar parabolic reflector collector 58 is stored at very high temperature, through double conduit 66 and pump 56 into an insulated solar fluid storage tank 74. An automatic pump 79 is controlling permanently the flow of said solar fluid into the boosting solar fluid chamber 104, the return of said fluid being insured by the return pipe 77. The boosting solar fluid temperature is transferred through the good heat-conducting material of the wall 20, and picked up through heat conduction by the inner wiper 30 which mixes said heat by heat conduction and convection through the whole area of boiler 102.

The working fluid in pressurized-gas state is spinning the turbine 94, then goes through conduit 96 to the condensing pipe 76, which can be used only as a conduit pipe to serve a condenser built according to the same technique as the above described evaporator. The condensing action of said pipe 76 is greatly enhanced by the cleaning and heat conducting actions of wiper 90 having up-and-down motion insured through changes in buoyancy between the time said wiper 90 reaches the lower portion of the pipe 76. An air injector 71 emptying said wiper tank 90 until its buoyancy is sufficiently low to let wiper 90 go upward, said departure closing said injector 71 which is fed in compressed air through the conduit 81 by the air compressor 82. When said wiper tank 90 reaches the top of pipe 76 into the service collar 68, a finger 19 opens two valves situated respectively at the top and at the bottom of said wiper tank 90, which is then filled up through its bottom valve by water as air escapes from the top valve. Consequently, being much heavier, its weight is enough to let it escape the finger 19 and return to the bottom, where the cycle is repeated. The mechanism of the valves on tank 90 being well known is not further described. The described wiper 90 can be actuated mechanically and made to spin around.

The condensing action of pipe 76 is equally greatly enhanced by the work of devices described in FIGS. 10, 11, 12, and 13, which keep the condensate rapidly drained to the bottom of the pipe 76. This leaves a wetted, highly condensing, molecular-thick film surface for fast evaporation.

Recirculation of the working fluid in a liquid state is enhanced by the lifting effect provided by the roots-type pump 21 set at the bottom of the liquid line 82, injecting said working fluid in a gas state into said liquid line 82. Said gaseous working fluid being recovered by separator 152 and fed back to the conduit 126 through the pump 122.

The necessary flexibility of the pipe 76 is insured through the use of flexible joints 86 in order to stand the pressure of water movements and currents.

The above described solar power plant can be steered as well as propelled through the correct adjustment of the rotation of modular units 12 and through the propelling action of fins 148.

The pumping of oil (or other lubricant lighter than water) from the lowest portion of the structure provides an easier way to keep the structure clean of corrosion and biofouling and at the same time provides better sliding effect of said wipers over said structure surfaces. The oil, because of its density, is constantly rising toward the surface and always kept in contact with such surfaces, through the physical process of separation of insoluble liquids, said oil is recovered at the top of the structure of each unit 12 in a oil containment collar 50 and recirculated through pump 54 and storage tank 72. Said wiper 24 can be connected to the above described oil closed circuit system in order to distribute or collect said lubricant.

Oil can be added to the working fluid in order to improve the sliding effect of inner wipers 30 or 138, 140, etc . . . as well as to avoid corrosion of the boiler walls 18 and 20, and related mechanisms.

It is emphasized that this type of power plant hereby described can be set in operation on shore. The units 12 being installed in a pool of circulating warm waters and having a condenser set down into the depths of chilled waters of a nearby body of water. Equally, this type of power plant can be used in lakes, rivers, and any body of water as well as in the mountains using geothermal or solar temperatures in connection with the cold temperature of the glaciers.

Equally, this type of heat exchanger hereby described can be used in land operation in replacement of the tubes and shells type, or plates or panels type, or coil heat exchanger type, etc., in fact, everywhere enhanced performances are needed. It is contemplated that in such utilization, the condenser will be made of the same type as the described evaporator and their outer walls will be in contact with the primary hot and cold fluids.

While the foregoing description and accompanying drawings are directed to a preferred illustrative embodiment of the instant invention and its manner of use, it will be understood that structural details may be modified to suit the invention to particular specific adaptions without departing from the spirit of the invention. Accordingly it will be understood that it is intended and desired to embrace within the scope of the invention such modifications and changes as may be necessary or desirable to adapt it to varying conditions and uses as defined by the scope of the appended claims.

What I claim as new and desire to secure by Letters Patent is:

1. A submerged power plant for converting the potential energy of ocean thermoclines to usable energy including a submerged boiler for vaporizing a working fluid as a result of a heat exchange with the relatively warm surrounding surface water, a turbine for work expanding the vaporized working fluid from the boiler, and a submerged condenser for liquifying the exhaust from the turbine as a result of a heat exchange with the relatively cold surrounding subsurface water, the improvement comprising:

wiper means affixed to each of said boiler and condenser for cleaning the outer surfaces of said boiler and condenser so as to enhance the heat transfer between said outer surfaces and the surrounding ocean water, and subsurface means for continously distributing a lubricant film over the outer surfaces of said boiler and condenser so as to inhibit corrosion and marine growth thereon.

* * * * *